US011869250B2

(12) United States Patent
Bush et al.

(10) Patent No.: US 11,869,250 B2
(45) Date of Patent: Jan. 9, 2024

(54) SYSTEMS AND METHODS FOR DETECTING TRAFFIC OBJECTS

(71) Applicant: GM GLOBAL TECHNOLOGY OPERATIONS LLC, Detroit, MI (US)

(72) Inventors: Lawrence A Bush, Shelby Township, MI (US); Guangyu J Zou, Warren, MI (US); Aravindhan Mani, Troy, MI (US); Upali P Mudalige, Oakland Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 214 days.

(21) Appl. No.: 17/410,211

(22) Filed: Aug. 24, 2021

(65) Prior Publication Data
US 2023/0068046 A1 Mar. 2, 2023

(51) Int. Cl.
*G06V 20/58* (2022.01)
*G06T 3/40* (2006.01)
*G06T 7/70* (2017.01)
*B60W 60/00* (2020.01)
*G06V 10/22* (2022.01)

(52) U.S. Cl.
CPC ......... *G06V 20/582* (2022.01); *B60W 60/001* (2020.02); *G06T 3/40* (2013.01); *G06T 7/70* (2017.01); *G06V 10/22* (2022.01); *B60W 2420/42* (2013.01); *B60W 2420/52* (2013.01); *B60W 2552/00* (2020.02); *G06T 2207/20084* (2013.01)

(58) Field of Classification Search
CPC ...... G06V 20/582; G06V 10/22; G06V 20/56; G06V 10/82; B60W 60/001; B60W 2420/42; B60W 2420/52; B60W 2552/00; G06T 3/40; G06T 7/70; G06T 2207/20084

See application file for complete search history.

(56) References Cited

U.S. PATENT DOCUMENTS

| 11,210,533 B1* | 12/2021 | Cha ......................... G06V 20/58 |
| 2013/0177203 A1* | 7/2013 | Koo ....................... G06V 20/20 |
| | | 382/103 |
| 2019/0361454 A1* | 11/2019 | Zeng ..................... G05D 1/0214 |
| 2020/0081448 A1* | 3/2020 | Creusot .................. G06V 10/25 |
| 2020/0160070 A1* | 5/2020 | Sholingar ................. G06T 7/70 |
| 2021/0149404 A1* | 5/2021 | Zeng ..................... G06V 20/58 |

(Continued)

FOREIGN PATENT DOCUMENTS

CN 115100251 A * 9/2022

OTHER PUBLICATIONS

Object detection algorithm based on improved Yolov3-tiny network in traffic scenes—2020 (Year: 2020).*

*Primary Examiner* — Nizar N Sivji
(74) *Attorney, Agent, or Firm* — Lorenz & Kopf LLP

(57) ABSTRACT

Systems and methods of detecting a traffic object outside of a vehicle and controlling the vehicle. The systems and methods receive perception data from a sensor system included in the vehicle, determine a focused Region Of Interest (ROI) in the perception data, scale the perception data of the at least one focused ROI, process the scaled perception data of the focused ROI using a neural network (NN)-based traffic object detection algorithm to provide traffic object detection data, and control at least one vehicle feature based, in part, on the traffic object detection data.

18 Claims, 6 Drawing Sheets

(56) References Cited

U.S. PATENT DOCUMENTS

| | | | |
|---|---|---|---|
| 2021/0197859 A1* | 7/2021 | Canady | B60W 60/0015 |
| 2021/0276587 A1* | 9/2021 | Urtasun | G06N 3/08 |
| 2021/0278257 A1* | 9/2021 | Dharia | G06V 20/56 |
| 2021/0390351 A1* | 12/2021 | St. Romain, II | G06V 10/454 |
| 2021/0406679 A1* | 12/2021 | Wen | G06V 20/56 |
| 2022/0019768 A1* | 1/2022 | Tsuji | H04N 23/698 |
| 2022/0036184 A1* | 2/2022 | Liu | G06N 3/045 |
| 2022/0405952 A1* | 12/2022 | Niesen | G06T 7/70 |

\* cited by examiner

SYSTEMS AND METHODS FOR DETECTING TRAFFIC OBJECTS

TECHNICAL FIELD

The present disclosure generally relates to vehicles, systems and methods using an artificial neural network for traffic object detection.

Autonomous and semi-autonomous vehicles are capable of sensing their environment and navigating based on the sensed environment. Such vehicles sense their environment using sensing devices such as radar, lidar, image sensors, and the like. The vehicle system further uses information from global positioning systems (GPS) technology, navigation systems, vehicle-to-vehicle communication, vehicle-to-infrastructure technology, and/or drive-by-wire systems to navigate the vehicle.

Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels. Some automated vehicle systems include a neural network based detector for detecting traffic objects such as traffic lights and road signs. However, some traffic object detectors are computationally intensive, may not accurately detect at high range and require transmission of large sets of data from the sensor system to the neural network.

Accordingly, it is desirable to provide systems and methods that detect traffic objects with increased computational efficiency, without sacrificing, and optimally improving, object detection performance. It is further desirable to reduce data transmission requirements between a sensor system and the neural network-based detector. Furthermore, other desirable features and characteristics of the present invention will become apparent from the subsequent detailed description and the appended claims, taken in conjunction with the accompanying drawings and the foregoing technical field and background.

SUMMARY

In one aspect, there is provided a method of detecting a traffic object outside of a vehicle and controlling the vehicle. The method includes receiving, via a processor, perception data from a sensor system included in the vehicle, determining, via the processor, at least one focused Region Of Interest (ROI) in the perception data, scaling, via the processor, the perception data of the at least one focused ROI, processing the scaled perception data of the focused ROI using a neural network (NN)-based traffic object detection algorithm to provide traffic object detection data, and controlling, via the processor, at least one vehicle feature based, in part, on the traffic object detection data.

In embodiments, scaling is performed by digital or optical zooming.

In embodiments, scaling is performed by digital zooming prior to compressing raw perception data from the sensor system.

In embodiments, the perception data is obtained by image data from a camera, LiDAR data from a LiDAR device or RADAR data from a RADAR device.

In embodiments, the method includes determining, via the processor, a plurality of focused Regions Of Interest (ROIs) in the perception data, scaling, via the processor, the perception data of each of the plurality of focused ROIs, and processing, as a batch, the scaled perception data of each of the focused ROIs using the NN-based traffic object detection algorithm to provide traffic object detection data.

In embodiments, the method includes scaling, via the processor, the perception data of the at least one focused ROI so as to achieve a target pixel density value or a target pixel density value range.

In embodiments, the traffic object detection data includes an identification of the traffic object and a location of the traffic object.

In embodiments, the focused ROI is determined based on map knowledge of a location of the at least one traffic object, prior distribution knowledge of a location of the at least one traffic object, or a fast traffic object detector. The fast traffic object detector has relatively fast traffic object detection speeds as compared to the NN-based traffic object detection algorithm.

In embodiments, the focused ROI is determined, at least in part, by receiving location data and dimensions data for the at least one traffic object in real world space, and transforming the location data and dimensions data into perception data space in order to determine the focused ROI.

In embodiments, the method includes performing, via the processor, an optimization loop by which a scaling level is adjusted based on a confidence value, a dimensions value output by the NN-based traffic object detection algorithm and tracking results from previous frames as part of the traffic object detection data, and scaling, via the processor, the perception data of the focused ROI according to the adjusted scaling level.

In embodiments, scaling comprises cropping the perception data according to the focused ROI.

In embodiments, scaling comprises up sampling or down sampling the perception data.

In embodiments, the traffic object includes a traffic sign or a traffic signaling device.

In embodiments, wherein determining, via the processor, at least one focused Region Of Interest (ROI) in the perception data is based on location data for the traffic object, wherein the location data is obtained based on a blend of at least two of: a fast traffic object detector, prior traffic object detection distribution information based on prior perception data, prior distribution information associating map information and perception data, concurrent LiDAR data when the perception data is image data from a camera device, and tracking of the traffic object based on prior traffic object detection data.

In another aspect, a system is provided. The system detecting a traffic object outside of a vehicle and controlling the vehicle. The system includes a sensor system, a vehicle control system, a processor in operable communication with the sensor system and the vehicle control system. The processor is configured to execute program instructions. The program instructions are configured to cause the processor to: receive perception data from the sensor system, determine a focused Region Of Interest (ROI) in the perception data, scale the perception data of the focused ROI, process the scaled perception data of the focused ROI using a neural network (NN)-based traffic object detection algorithm to provide traffic object detection data, and control, via the vehicle control system, a vehicle feature based, in part, on the traffic object detection data.

In embodiments, scaling is performed by digital zooming prior to compressing raw perception data from the sensor system.

In embodiments, the program instructions are configured to cause the processor to: determine a plurality of focused Regions Of Interest (ROIs) in the perception data, scale the perception data of each of the plurality of focused ROIs, and process, as a batch, the scaled perception data of each of the focused ROIs using the NN-based traffic object detection algorithm to provide traffic object detection data.

In embodiments, scaling the perception data of the focused ROI is performed so as to achieve a target pixel density value or a target pixel density value range.

In embodiments, the program instructions are configured to cause the processor to: perform an optimization loop by which a scaling level is adjusted based on a confidence value, a dimensions value output by the NN-based traffic object detection algorithm and tracking results from previous frames as part of the traffic object detection data; and scale the perception data of the focused ROI according to the adjusted scaling level.

In embodiments, determining at least one focused Region Of Interest (ROI) in the perception data, is based on location data for the at least one traffic object, wherein the location data is obtained based on a blend of at least two of: a fast traffic object detector, prior traffic object detection distribution information based on prior perception data, prior distribution information associating map information and perception data, concurrent LiDAR data when the perception data is image data from a camera device, and tracking of the at least one traffic object based on prior traffic object detection data.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
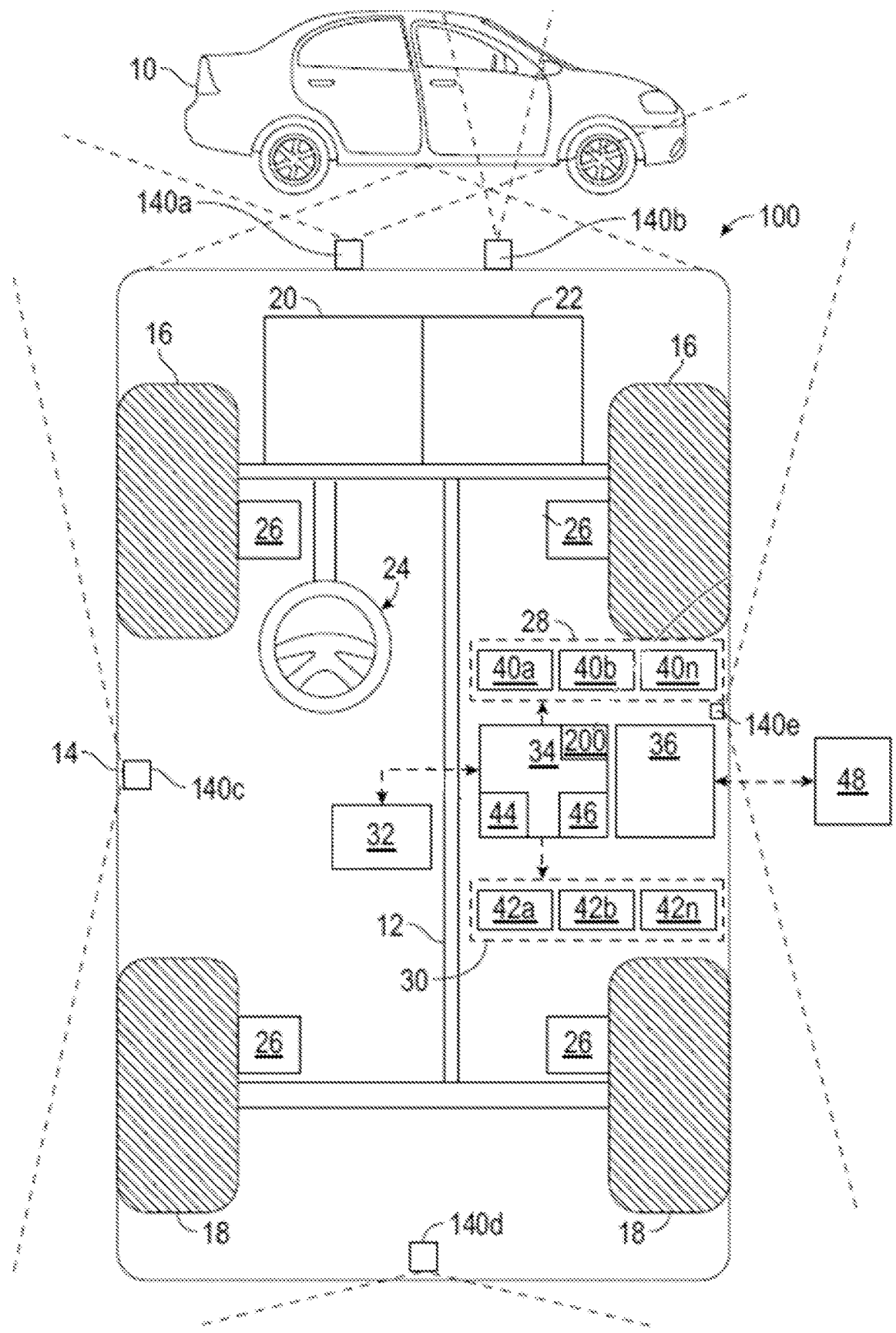
FIG. 1 is a functional block diagram illustrating an autonomous or semi-autonomous vehicle system utilizing automatic scaling of a Region Of Interest (ROI) and processing the scaled ROI with a Neural Network (NN) based traffic object detection module, in accordance with various embodiments.

With reference to FIG. 1, a vehicle system shown generally at 100 is associated with a vehicle 10 in accordance with various embodiments. In general, the vehicle system 100 includes an ROI scaling and traffic object detection system 200 (referred to as a traffic object detection system 200 herein) that points attention to one or more ROIs where the traffic object detection system 200 has determined that a traffic object may be found and scales the ROIs to a level preferred by a traffic object detection Neural Network (NN). The traffic object detection system 200 implements methods with automatically focused and scaled ROIs to sense distant traffic objects including road signs and Traffic Signal Devices (TSDs). In the case of TSDs, the traffic object detection system 200 may resolve states of the TSDs. In one exemplary embodiment, the traffic object detection system 200 uses a map and current vehicle position to infer potential pertinent traffic object locations in the field of view including estimated ranges. The relative positions of the vehicle 10 and the traffic objects can be inferred from the location of the traffic objects specified in the map, which, through projection processing, allows an estimation to be made of where the traffic objects can likely be found in image space, thereby setting an ROI. Other auxiliary information, e.g. map priors, detection priors, lightweight camera-lidar detections, tracking results from immediate past, V2X reception, etc. can also be integrated to improve the accuracy of ROI inference. The traffic object detection system 200 exploits an inherent scale preference of Deep Convolutional Neural Networks (DCNNs) included in a traffic object detector by focusing processing on pertinent areas and bringing potential targets into pre-calibrated scale range with optical or digital zooming. As such, the detection and state prediction of a DCNN is further improved given the high variability and complexity of road scenarios. Experimental results have shown that systems and methods described herein improve traffic object detection and, where relevant, signal interpretation for challenging situations.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In some embodiments, the vehicle 10 is an autonomous vehicle and the traffic object detection system 200 is incorporated into the autonomous vehicle 10 (hereinafter referred to as the autonomous vehicle 10). The present description concentrates on an exemplary application in autonomous vehicle applications. It should be understood, however, that the traffic object detection system 200 described herein is envisaged to be used in semi-autonomous automotive vehicles.

The autonomous vehicle 10 is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the vehicle wheels 16-18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras 140a-140n, thermal cameras, ultrasonic sensors, and/or other sensors. The optical cameras 140a-140n are mounted on the vehicle 10 and are arranged for capturing images (e.g. a sequence of images in the form of a video) of an environment surrounding the vehicle 10. In the illustrated embodiment, there are two front cameras 140a, 140b arranged for respectively imaging a wide angle, near field of view and a narrow angle, far field of view. Further illustrated are left-side and right-side cameras 140c, 140e and a rear camera 140d. The number and position of the various cameras 140a-140n is merely exemplary and other arrangements are contemplated. The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

The data storage device 32 stores data for use in automatically controlling the autonomous vehicle 10. In various embodiments, the data storage device 32 stores defined maps of the navigable environment. In various embodiments, the defined maps 302 (see FIG. 3) may be predefined by and obtained from a remote system. For example, the defined maps may be assembled by the remote system and communicated to the autonomous vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, one or more instructions of the controller 34 are embodied in the traffic object detection system 200 and, when executed by the processor 44, are configured to implement the methods and systems described herein for automatically determining one or more ROIs in perception data from the sensor system 28, scaling the ROIs to a level preferred by an NN traffic object detector (described with reference to FIG. 3) and processing the scaled ROIs through the NN traffic object detector to detect traffic objects such as TSDs.

The communication system 36 is configured to wirelessly communicate information to and from other entities 48, such as but not limited to, other vehicles ("V2V" communication) infrastructure ("V2I" communication), remote systems, and/or personal devices. In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

As can be appreciated, the subject matter disclosed herein provides certain enhanced features and functionality to what may be considered as a standard or baseline autonomous vehicle 10. To this end, an autonomous vehicle and autonomous vehicle based remote transportation system can be modified, enhanced, or otherwise supplemented to provide the additional features described in more detail below. The subject matter described herein concerning the traffic object detection system 200 is not just applicable to autonomous driving applications, but also other driving systems having one or more automated features utilizing automatic traffic object detection.

Figure 2:
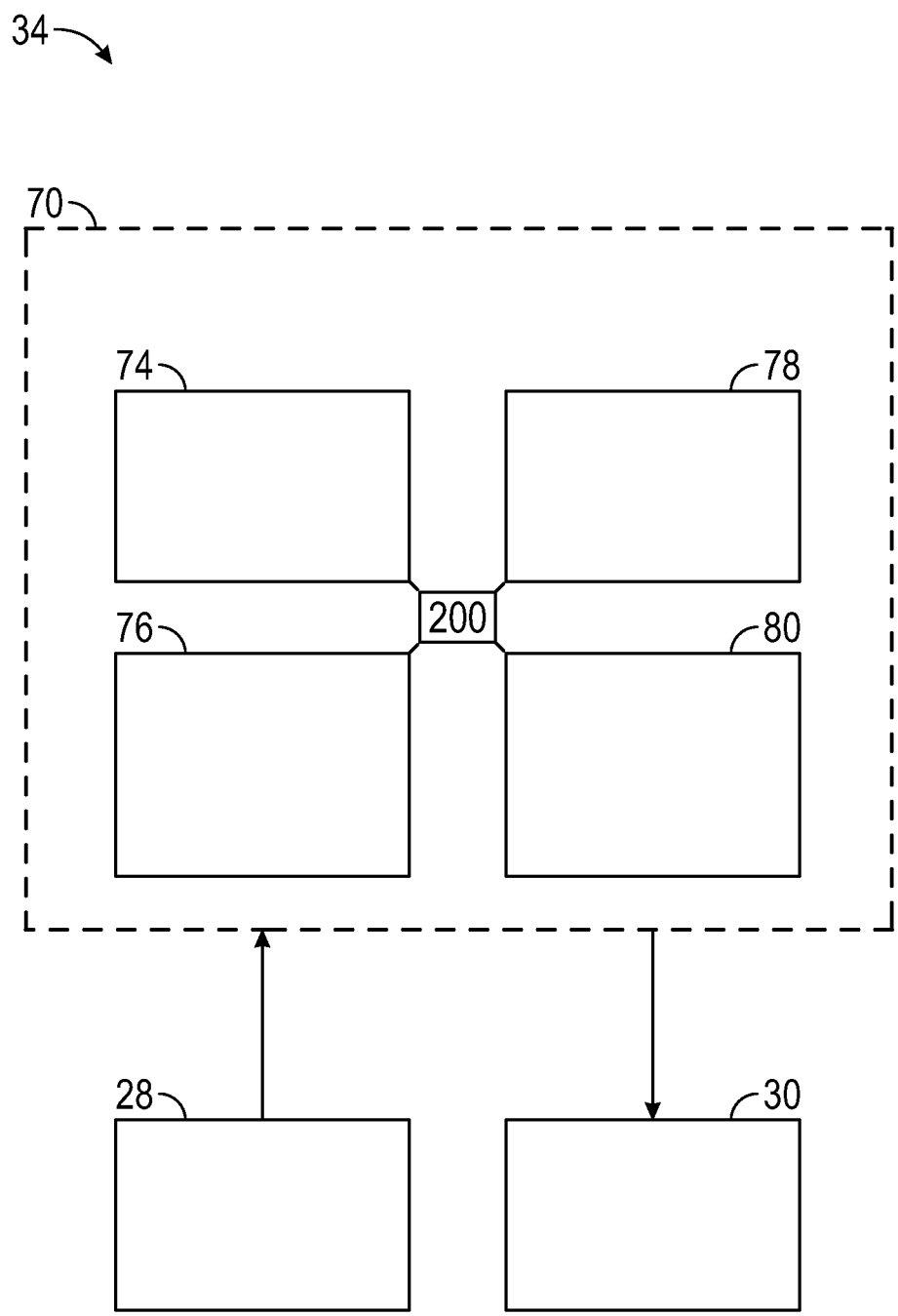
FIG. 2 is a dataflow diagram illustrating an autonomous driving system that includes a traffic object detection module, in accordance with various embodiments.

In accordance with an exemplary autonomous driving application, the controller 34 implements an autonomous driving system (ADS) 70 as shown in FIG. 2. That is, suitable software and/or hardware components of the controller 34 (e.g., the processor 44 and the computer-readable storage device 46) are utilized to provide an autonomous driving system 70 that is used in conjunction with vehicle 10.

Figure 3:
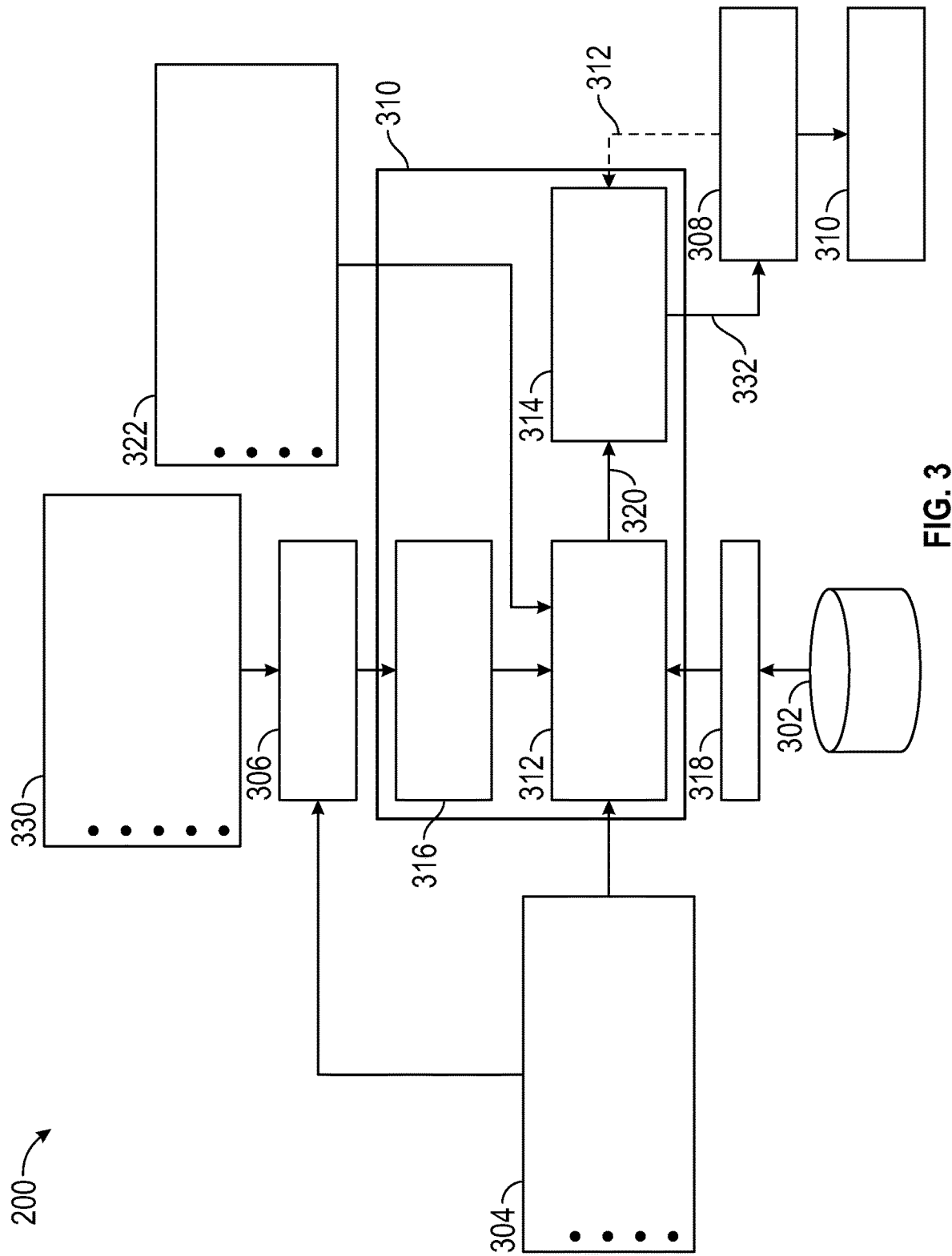
FIG. 3 is a system diagram illustrating functional blocks for determining and scaling an ROI and processing the ROI using an NN based traffic object detection module, in accordance with various embodiments.

In various embodiments, the instructions of the autonomous driving system 70 may be organized by function, module, or system. For example, as shown in FIG. 3, the autonomous driving system 70 can include a computer vision system 74, a positioning system 76, a guidance system 78, and a vehicle control system 80. As can be appreciated, in various embodiments, the instructions may be organized into any number of systems (e.g., combined, further partitioned, etc.) as the disclosure is not limited to the present examples.

In various embodiments, the computer vision system 74 synthesizes and processes sensor data and predicts the presence, location, classification, and/or path of objects and features of the environment of the vehicle 10. In various embodiments, the computer vision system 74 can incorporate information from multiple sensors, including but not limited to, cameras, lidars, radars, and/or any number of other types of sensors. The computer vision system 74 provides perception data 304 (see FIG. 3) that is subject to ROI attention determination and scaling processing in the traffic object detection system 200 described herein.

The positioning system 76 processes sensor data along with other data to determine a position (e.g., a local position relative to a map, an exact position relative to lane of a road, vehicle heading, velocity, etc.) of the vehicle 10 relative to the environment. The guidance system 78 processes sensor data along with other data to determine a path for the vehicle 10 to follow. The vehicle control system 80 generates control signals for controlling the vehicle 10 according to the determined path. The positioning system 76 may be at least partly implemented by the vehicle localization module 306 of FIG. 3. As shown, the positioning system 76 may process a variety of types of raw localization data 330 in determining a location of the vehicle 10 including Inertial Measurement Unit data, Global Positioning System (GPS) data, Real-Time Kinematic (RTK) correction data, cellular and other wireless data (e.g. 4G, 5G, V2X, etc.), etc.

In various embodiments, the controller 34 implements machine learning techniques to assist the functionality of the controller 34, such as feature detection/classification, obstruction mitigation, route traversal, mapping, sensor integration, ground-truth determination, and the like. One such machine learning technique performs traffic object detection whereby traffic objects are identified, localized and optionally the status is determined for further processing by the guidance system 78. The machine learning technique may be implemented by a DCNN. For example, a TSD (e.g. a traffic light) may be identified and localized and the light status determined. Depending on the state of the traffic light (e.g. red for stop or green for go), the guidance system 78 and the vehicle control system 80 operate together to determine whether to stop or go at the traffic lights.

As mentioned briefly above, the traffic object detection system 200 of FIG. 1 (and FIG. 3) is included within the ADS 70 in autonomous driving applications, for example in operable communication with the computer vision system 74, the positioning system 76, the guidance system 78 and the vehicle control system 80. The traffic object detection system 200 is configured to determine traffic object data 310 using an NN by processing localization data from the positioning system 76 and perception data 304 from the computer vision system 74. Such traffic object data 310 is utilizable by the guidance system 78 to determine upon a trajectory for the vehicle 10. The vehicle control system 80 works with the actuator system 30 to traverse such a trajectory.

Referring to FIG. 3, with continued reference to FIGS. 1 and 2, the traffic object detection system 200 is further illustrated in accordance with exemplary embodiments. The traffic object detection system 200 includes functional modules that are performed by the programming instructions described hereinbefore. The traffic object detection system 200 includes a data preparation module 311 that receives perception data 304 from the computer vision system 74. The perception data 304 can be image sequences (e.g. video data) from one or more of the cameras 140a to 140e, LiDAR data, RADAR data, ultrasound data or a combination thereof, which originates from the sensor system 28. The data preparation module 311 is configured to focus attention on part of the incoming perception data 304 that is considered likely to include a traffic object of interest. The focused part (ROI) of the perception data 304 is scaled so as to have an optimal pixel density for traffic object recognition by an NN-based traffic object detector included in a traffic object detection module 308.

In the exemplary embodiment, the data preparation module 311 includes a focus area (ROI) determination sub-module 312 and a zoom level determination sub-module 314. The focus area (ROI) determination sub-module 312 serves as an attention pointer identifying ROIs in the perception data 304. In order to determine the ROIs, the focus area (ROI) determination sub-module 312 may receive localization data 316 from the vehicle localization module 306 defining a three-dimensional location of the vehicle 10. Further, focus area (ROI) determination sub-module 312 receives map data 318 from the maps 302 that defines, inter-alia, a road network reflecting roads in the real world and traffic objects. The map data 318 includes geospatial information for the traffic objects so that the location of different types of static traffic objects (e.g. road signs and TSDs) in the world can be known. Based on the 3D location of the vehicle 10 defined in the localization data 316 and the 3D location of traffic objects in the perception range of the vehicle 10, it is possible to estimate a depth (a distance away) of each traffic object relative to the vehicle 10. Based on a known model of the particular sensor device (e.g. a camera model when the perception data 304 is images), the relative location of the vehicle 10 and the traffic objects, known dimensions of the traffic objects (which can be a priori knowledge or data included in the maps 302), estimated location and size of the traffic objects in image space can be derived. In the exemplary embodiment, traffic object dimensions data 322 is provided as an input to the focus area (ROI) determination sub-module 312 to be used as the known dimensions. The traffic object dimensions data 322 can include dimensions of traffic lights, road signs, junction outlets, etc. as just some examples of traffic objects. The focus area (ROI) determination sub-module 312 outputs ROI data 320 defining, in image (or other perception data) space, the size and location of ROIs found by the focus area (ROI) determination sub-module 312. The ROI data 320 may include one or more bounding boxes defining a region in the perception data 304 that should be the focus of scaling and further processing by the traffic object detection module 308.

The focus area (ROI) determination sub-module 312 has been described with respect to a map based determination of the ROIs. However, other, or additional, techniques can be used to determine where the traffic objects are likely to be within the perception data 304. In one example, a fast traffic object detector can be included (not shown) that pre-processes the perception data 304 to estimate the ROIs. The output from the fast traffic object detector will be faster than traffic object detections in the traffic object detection module 308 and the results are likely to be less refined. However, the fast traffic object detector can provide a first pass of the perception data 304 for identifying ROIs. The fast traffic object detector includes a neural network (e.g. a CNN) such as a High-Resolution Net (HRN) to identify the ROIs. In another embodiment, prior detection information (e.g. camera and/or Lidar) is used to develop a distribution over where the traffic objects usually are located in the perception data 304 (e.g. row, column, distance away) and this distribution can guide the ROI determination. In another embodiment, prior map information (over time) is used to develop a distribution over where the traffic object are usually located in the perception data (e.g. row, column, distance away). In another embodiment, prior map data is used to produce a distribution over how far away the relevant traffic objects are likely to be. In a further embodiment, Lidar or Radar is used to estimate the distance away of the traffic object. These various techniques allow an estimation of likelihood of location in three-dimensional real world space, which can be converted to a ROI in perception data space using known projection transformation processing or other methods, or the location is provided directly in perception data space. In some embodiments, a weighted blend of these techniques is used to estimate a location of traffic object, thereby providing a distribution of locations (e.g. in the form of blended probability or heat maps) in, for example, real world space, which is converted to perception data space using a model of the perception data sensor (e.g. a camera) and known dimensions of the traffic object from the traffic object dimensions data 322. In one exemplary embodiment, the map based method of FIG. 3 is combined with at least one of: traffic object distribution from prior map knowledge, traffic object distribution from prior perception data knowledge and a fast detector. When blending the outputs of these various techniques, the map based technique may have a greater weighting than the fast detector method, which has a greater weight, in turn, than the map and sensing priors technique.

In addition to, or in the alternative to, the above techniques, the focus area (ROI) determination sub-module 312 may use a tracking algorithm to track where traffic objects have previously been detected by the traffic object detection module 308, thereby informing the likely location of ROIs in future processing iterations. Motion based target tracking can make use of a Kalman filter, a motion model, and motion state data of the vehicle 10 from the sensor system 28 to predict a future relative location of traffic objects that have been validly detected by the traffic object detection module 308, which can be set as ROIs and included in ROI data 320.

Figure 4:
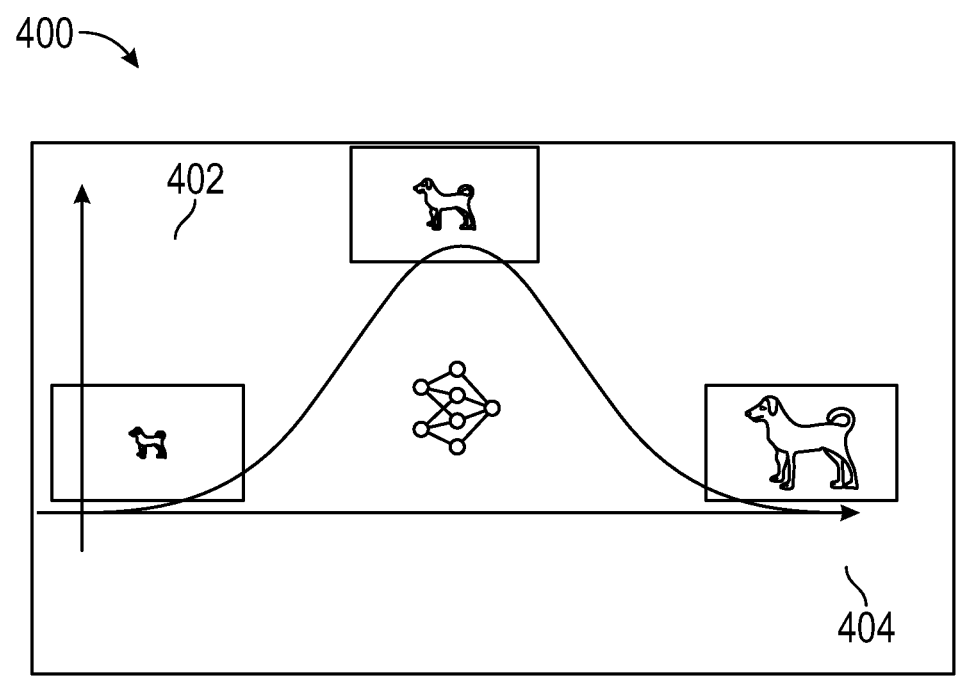
FIG. 4 is a graph of detection performance versus scale to illustrate scale preferences of an exemplary NN-based detector, in accordance with various embodiments.

Continuing to refer to FIG. 3, the traffic object detection system 200 includes the zoom level determination sub-module 314, which receives the ROI data 320 from the focus area determination sub-module 312 and receives offline/online zooming factor calibration data 313. The offline/online zooming factor calibration data 313 is an indication of an optimal scaling value (or pixel density) or scaling value range with respect to detection performance. Referring to the graph 400 of FIG. 4, it has been found by the present inventors that a traffic object detection NN has a detection performance (y-axis 402) that varies with scale (x-axis 404) of the input perception data 304. In particular, the perception performance degrades when the scale of the traffic object falls out of an optimal range. The present disclosure proposes to scale the perception data of each ROI into optimal scale according to detection performance. An initial value or range for the scaling target, which is included in the calibration data 313, can be set by testing of the traffic object detection module 308 offline. This value can be refined and dynamically adjusted during online use of the traffic object detection module 308, as will be explained further with reference to FIG. 6 below. In essence, a zoom level is iteratively adjusted to optimize a confidence value and consistency rating of the output of the traffic object detection module 308, where this optimized zoom level can be incorporated into offline/online zooming factor calibration data 313 for use as a target zoom or scaling factor in subsequent processing.

Figure 5:
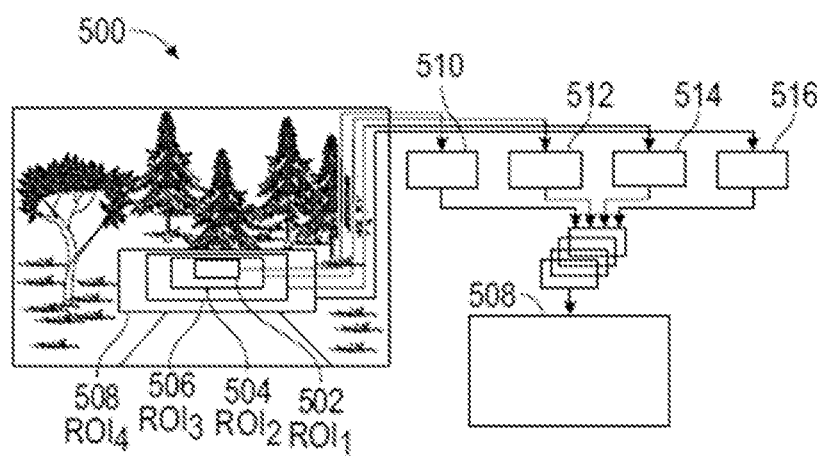
FIG. 5 depicts extraction and scaling of ROIs, in accordance with various embodiments.

The zoom level determination sub-module 314 extracts (or crops) the perception data 304 so as to operate on part of the perception data falling within each ROI as defined in the ROI data 320. The perception data 304 is then scaled so as to meet the target zoom level value or range defined in the calibration data 313. An example of such cropping and scaling is illustrated in FIG. 5 where a plurality of ROIs 502, 504, 506, 508 have been identified and defined by a bounding box by the focus area (ROI) determination sub-module 312. In the present example, each bounding box is of a different size and they partly overlap with one another. However, non-overlapping bounding boxes would occur depending on where the traffic objects are located in the perception data 304. The input perception data 500 is cropped according to the bounding boxes and a different zoom factor is applied to each ROI of perception data 500 based on their relative sizes so as to bring each ROI to a common scale that aligns with the optimal detection scale of the traffic object detection module 308. The result of the processing by zoom level determination sub-module 314 is a plurality of cropped and scaled boxes or ROIs of perception data 510, 512, 514, 516, which are fed to the traffic object detection module 308 for further processing. The scaling process sets a common target aspect ratio and/or area of input perception data 500 for each ROI and a target pixel density. The target aspect ratio and/or area of input perception data 500 for each ROI and the target pixel density are included in the offline/online zooming factor calibration data 313. As can be seen in FIG. 5, the cropped and scaled ROIs of perception data 510, 512, 514, 516 are batched (e.g. concatenated or otherwise combined) so as to pass through the NN of the traffic object detection module 308 in parallel. In one embodiment, the ROIs are batched together and also combined with the full input perception data 500 from which the ROIs were extracted for processing by the traffic object detection module 308.

In embodiments, the zoom level determination sub-module 314 executes one or a combination of various scaling processes. One example is optical scaling, whereby an optical zoom of one or more of the cameras 140a to 140e is controlled to scale the one or more ROIs to meet the target size. In another example, the perception sensors such as the cameras 140a to 140e, the LiDAR or the RADAR compress perception data 304 prior to sending the perception data 304 over a communications bus to the controller 34 for processing by, inter alia, the data preparation module 311 and the traffic object detection module 308. Instead of sending the full set of compressed perception data 304 per frame, the ROI data 320 may be sent to a control system of the perception sensors (included in the sensing devices 40a to 40n and the cameras 140a to 140e) to send over focused perception data 304 corresponding to the one or more ROIs. The focused data may be sent in uncompressed form, lower compression form or in the same compressed form. In such an embodiment, the data transmission requirements between the perception sensors and the controller 34 can be reduced or higher resolution data can be sent for the same data transmission requirements. In another example, digital zooming is performed by the zoom level determination sub-module 314 by which the data is up-sampled to scale the ROI up and down-sampled to scale the ROI down. Exemplary down/up-sampling techniques include decimation/duplication and bilinear interpolation. Exemplary down-sampling algorithms include Mipmap, Box Sampling, and Sinc. Exemplary up-sampling algorithms include Nearest Neighbour Interpolation, Bilinear Interpolation, Bicubic Spline Interpolation, and Generalized Bicubic Interpolation.

The zoom level determination sub-module 314 outputs scaled ROI perception data 332. The scaled ROI perception data 332 includes a substantially common size (and aspect ratio) and having a substantially common pixel density for each ROI according to the target defined in the offline/online zooming factor calibration data 313. In some embodiments, each category (road sign, TSD, etc.) of traffic object has a different target scaling and thus the ROIs may be scaled differently depending on the traffic object type. The traffic object detection module 308 includes a trained NN, such as a DCNN, that detects traffic objects of one or more kinds. The traffic object detection module 308 thus outputs traffic object detection data 310, which may include a bounding box for each detected traffic object, an identifier of a type of traffic object, a confidence score and, in the case of TSDs, a status of the TSD. The status of the TSD can include:

State 0—no detection;
State 1—red;
State 2—yellow;
State 3—red and yellow;
State 4—green;
State 5—green yellow;
State 6—flashing red;
State 7—flashing yellow;
State 8 flashing green;

The above states are merely exemplary and different TSDs will have different status outputs. The status of the TSD determines whether the vehicle 10 should stop or go at the TSD. The traffic object detection data 310 can be utilized by various systems of the vehicle 10 to control driving thereof. For example, and with additional reference to FIG. 2, the traffic objection detection data 310 supports tracking of the traffic object, definition of the target trajectory by the guidance system 78 and control of the vehicle 10 by the vehicle control system 80.

Figure 6:
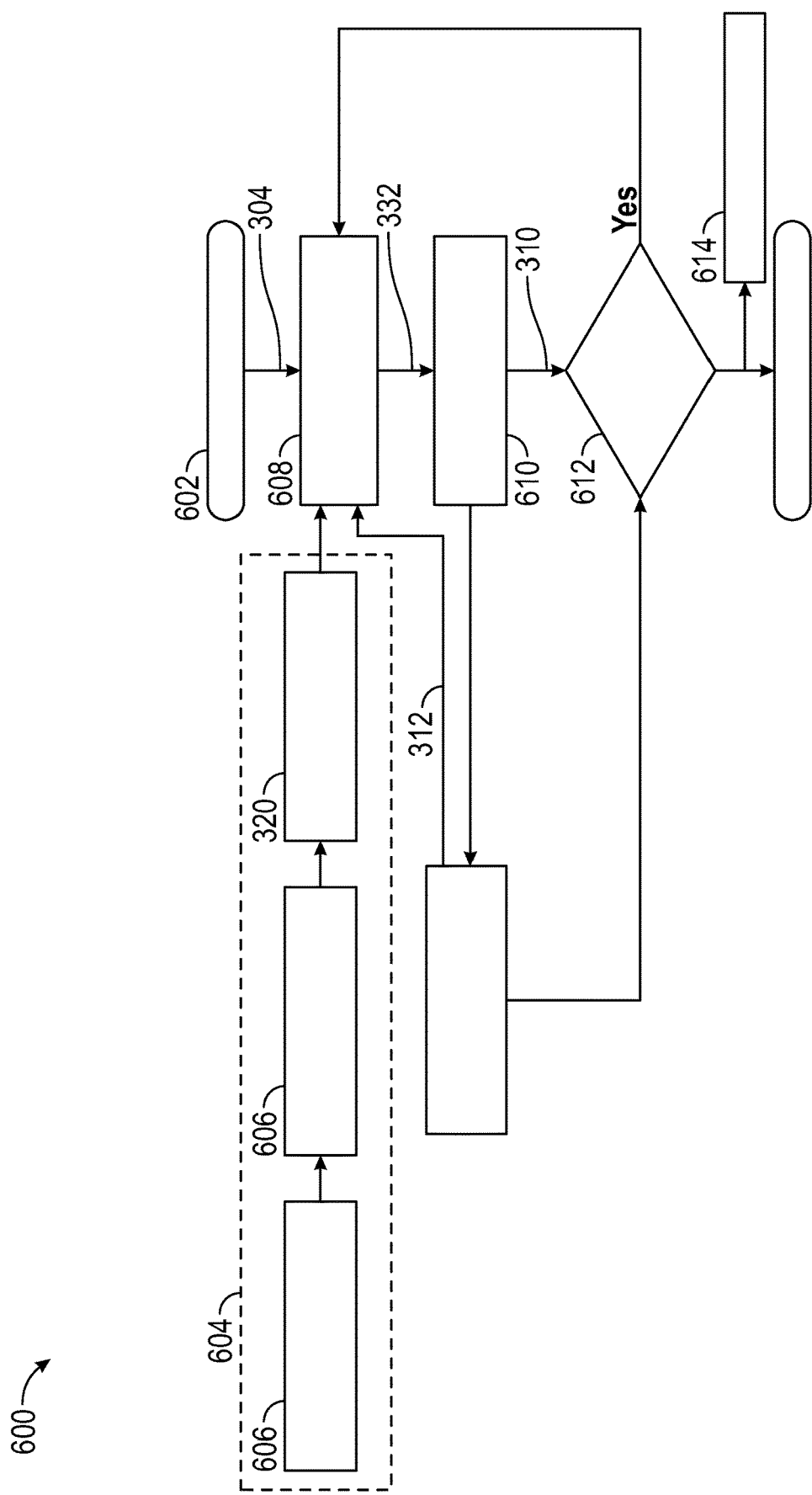
FIG. 6 is a flowchart illustrating method steps of an algorithmic process to detect traffic objects, in accordance with various embodiments.

Referring now to FIG. 6, and with continued reference to FIGS. 1-5, a flowchart illustrates a method of traffic object detection 600 that can be performed by the traffic object detection system of FIG. 3 in accordance with the present disclosure. As can be appreciated in light of the disclosure, the order of operation within the method is not limited to the sequential execution as illustrated in FIG. 6, but may be performed in one or more varying orders as applicable and in accordance with the present disclosure. In various embodiments, the method 600 can be scheduled to run based on one or more predetermined events, and/or can run continuously during operation of the autonomous vehicle 10. Method 600 is described with reference to the specific example of the perception data 304 being camera image data and zooming being performed digitally. However, and as will be appreciated from the foregoing, other types of perception data 304 may be used and other types of scaling are applicable.

At step 602, perception data 304 is received by the data preparation module 311. The perception data 304 can be received as sequences of images from cameras 140a to 140n or LiDAR or RADAR data from the other sensing devices 40a to 40n. In step 604, one or more focused ROIs are determined by the focus area (ROI) determination sub-module 312. In the illustrated embodiment, ROI location data 606 is provided. The ROI location data 606 may define one or more 3D volumes in real world space where traffic objects of interest may be found. The ROI location data 606 may define one or more points constituting an estimated center of each traffic object or an estimated 3D bounding box around each traffic object. The ROI location data 606 may also define a type of traffic object included, or expected to be included, in each ROI. The ROI location data 606 may be derived from any one, or a blend of any of, map data 318, from a fast CNN traffic object detector, from prior detection distribution information, from prior map distribution information, from LiDAR detection and from prior traffic object detection data 310 from the traffic object detection module 308. In step 606, a location transformation step is performed to transform the location of each ROI in 3D space to image space using a camera model, pose of the camera and vehicle location to project the ROIs into 2D image space. Step 604 of determining one or more focused ROIs thus provides the ROI data 320 for subsequent scaling processes. The ROI data 320 may include a 2D bounding box with dimensions and location and an identification of a type of traffic object.

Step 606 is a step of scaling the perception data 304 of the ROIs included in the ROI data 320. In the exemplary embodiment of FIG. 6, the scaling step is a digital scaling step but other scaling processes are applicable such as optical zooming. Step 606 includes cropping and resampling (up-sampling or down-sampling) the perception data 602 to extract and resize the perception data 304 according to the 2D bounding boxes included in the ROI data 320. The scaling of step 608 is performed so as to achieve a preferred or target pixel density, aspect ratio and size for each ROI as defined in the offline/online zooming factor calibration data 313. The targets used in step 608 may be dependent on the traffic object type or category included in the ROI.

In step 610, the scaled ROI perception data 332 is provided as an input to an NN based traffic object detection algorithm, specifically the traffic object detection module 308. In step 610, traffic object detection is performed, which results in the traffic object detection data 310. The traffic object detection data 310 includes traffic object location and dimensions (e.g. a refined bounding box around each detected traffic object), traffic object type, and confidence of the detection. In some embodiments, each of the ROIs of a particular traffic object type are input to the traffic object detection step 610 as a batch. Further, the full perception data 304 without cropping and sampling of step 608 may be added to the scaled ROI perception data 332, which has been found to further improve detection performance in some cases.

Method 600 may optionally include a feedback loop by which the zoom level is adjusted to further refine detection performance. In step 612, a determination is made as to whether to re-zoom. This determination is made based on whether the confidence score included in the traffic object detection data 310 for any given ROI is considered to be insufficiently high (e.g. is not greater than a predetermined threshold) and/or based on whether the dimensions of the traffic object included in the traffic object detection data 310 are unrealistic (e.g. by comparison with the expected dimensions included in the traffic object dimensions data 322). When a decision has been made in step 612 to re-zoom based on one or more of the detected traffic objects being considered of insufficient quality, the zoom level is adjusted in the offline/online zooming factor calibration data 313 and the method re-enters the scaling step 608 using the adjusted zoom (or pixel density) level. When step 612 determines that the detected traffic object results are acceptable, the traffic object detection data 310 is output to further vehicular systems for use as an input in determining vehicular control commands. The traffic object detection data 310 may be subjected to further validity/failure detection steps to determine whether there are possible false positives or unknown traffic object types.

In one embodiment, the method 600 includes a target tracking step 614 whereby the traffic objects in the traffic object detection data 310 are tracked based on vehicular motion information, historical knowledge of the traffic object location and by predicting a probable location of the traffic object in one or more future frames of perception data 304. The target tracking step 614 can thus provide predicted ROIs to use as an input for subsequent scaling processes starting with step 608. Target tracking provides a high likelihood of accuracy source of ROIs in addition to the ROIs determined based on map data and prior distribution knowledge as described further herein.

The present disclosure allows for high detection performance even at relatively large ranges. Further, detection performance by the traffic object detection module 308 is generally enhanced by the ROI focusing and scaling processes described herein. Yet further, the present disclosure allows uncompressed data from the cameras to be processed by transmitting and processing only the ROIs from the perception sensing devices 40a to 40n, 140a to 140n over a communications bus to the controller 34 rather than transmitting the full perception data, which is generally compressed before transmission because of bandwidth restrictions.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of detecting at least one traffic object outside of a vehicle and controlling the vehicle, the method comprising:
   receiving, via at least one processor, perception data from a sensor system included in the vehicle;
   determining, via the at least one processor, at least one focused Region Of Interest (ROI) in the perception data;
   scaling, via the at least one processor, the perception data of the at least one focused ROI;
   processing the scaled perception data of the at least one focused ROI using a neural network (NN)-based traffic object detection algorithm to provide traffic object detection data; and
   controlling, via the at least one processor, at least one vehicle feature based, in part, on the traffic object detection data,
   wherein determining, via the at least one processor, the at least one focused Region Of Interest (ROI) in the perception data is based on location data for the at least one traffic object, wherein the location data is obtained based on a blend of at least two of:
   a fast traffic object detector;
   prior traffic object detection distribution information based on prior perception data;
   prior distribution information associating map information and perception data;
   concurrent LiDAR data when the perception data is image data from a camera device; and
   tracking of the at least one traffic object based on prior traffic object detection data.

2. The method of claim 1, wherein scaling is performed by at least one of digital and optical zooming.

3. The method of claim 1, wherein scaling is performed by digital zooming prior to compressing raw perception data from the sensor system.

4. The method of claim 1, wherein the perception data is obtained by at least one of image data from a camera, LiDAR data from a LiDAR device or RADAR data from a RADAR device.

5. The method of claim 1, comprising determining, via the at least one processor, a plurality of focused Regions Of Interest (ROIs) in the perception data, scaling, via the at least one processor, the perception data of each of the plurality of focused ROIs, and processing, as a batch, the scaled perception data of each of the plurality of focused ROIs using the NN-based traffic object detection algorithm to provide the traffic object detection data.

6. The method of claim 1, wherein scaling, via the at least one processor, the perception data of the at least one focused ROI is performed so as to achieve a target pixel density value or a target pixel density value range.

7. The method of claim 1, wherein the traffic object detection data includes an identification of the at least one traffic object and a location of the at least one traffic object.

8. The method of claim 1, wherein the at least one focused ROI is determined based on at least one of: map knowledge of a location of the at least one traffic object, prior distribution knowledge of a location of the at least one traffic object, and a fast traffic object detector.

9. The method of claim 1, wherein the at least one focused ROI is determined, at least in part, by:
receiving location data and dimensions data for the at least one traffic object in real world space; and
transforming the location data and dimensions data into perception data space in order to determine the at least one focused ROI.

10. The method of claim 1, comprising:
performing, via the at least one processor, an optimization loop by which a scaling level is adjusted based on a confidence value and a dimensions value output by the NN-based traffic object detection algorithm as part of the traffic object detection data; and
scaling, via the at least one processor, the perception data of the at least one focused ROI according to the adjusted scaling level.

11. The method of claim 1, wherein scaling comprises cropping the perception data according to the at least one focused ROI.

12. The method of claim 1, wherein scaling comprises up sampling or down sampling the perception data.

13. The method of claim 1, wherein the at least one traffic object includes a traffic sign or a traffic signaling device.

14. A system of detecting at least one traffic object outside of a vehicle and controlling the vehicle, the system comprising:
a sensor system;
a vehicle control system; and
at least one processor in operable communication with the sensor system and the vehicle control system, wherein the at least one processor is configured to execute program instructions, wherein the program instructions are configured to cause the at least one processor to:
receive perception data from the sensor system;
determine at least one focused Region Of Interest (ROI) in the perception data;
scale the perception data of the at least one focused ROI;
process the scaled perception data of the at least one focused ROI using a neural network (NN)-based traffic object detection algorithm to provide traffic object detection data; and
control, via the vehicle control system, at least one vehicle feature based, in part, on the traffic object detection data,
wherein determining at least one focused Region Of Interest (ROI) in the perception data, is based on location data for the at least one traffic object, wherein the location data is obtained based on a blend of at least two of:
a fast traffic object detector;
prior traffic object detection distribution information based on prior perception data;
prior distribution information associating map information and perception data;
concurrent LiDAR data when the perception data is image data from a camera device; and
tracking of the at least one traffic object based on prior traffic object detection data.

15. The system of claim 14, wherein scaling is performed by digital zooming prior to compressing raw perception data from the sensor system.

16. The system of claim 14, wherein the program instructions are configured to cause the at least one processor to:
determine a plurality of focused Regions Of Interest (ROIs) in the perception data;
scale the perception data of each of the plurality of focused ROIs; and
process, as a batch, the scaled perception data of each of the plurality of focused ROIs using the NN-based traffic object detection algorithm to provide the traffic object detection data.

17. The system of claim 14, wherein scaling the perception data of the at least one focused ROI is performed so as to achieve a target pixel density value or a target pixel density value range.

18. The system of claim 14, wherein the program instructions are configured to cause the at least one processor to:
perform an optimization loop by which a scaling level is adjusted based on a confidence value, a dimensions value output by the neural network (NN)-based traffic object detection algorithm and tracking results from previous cycles as part of the traffic object detection data; and
scale the perception data of the at least one focused ROI according to the adjusted scaling level.

* * * * *